Figure 1:
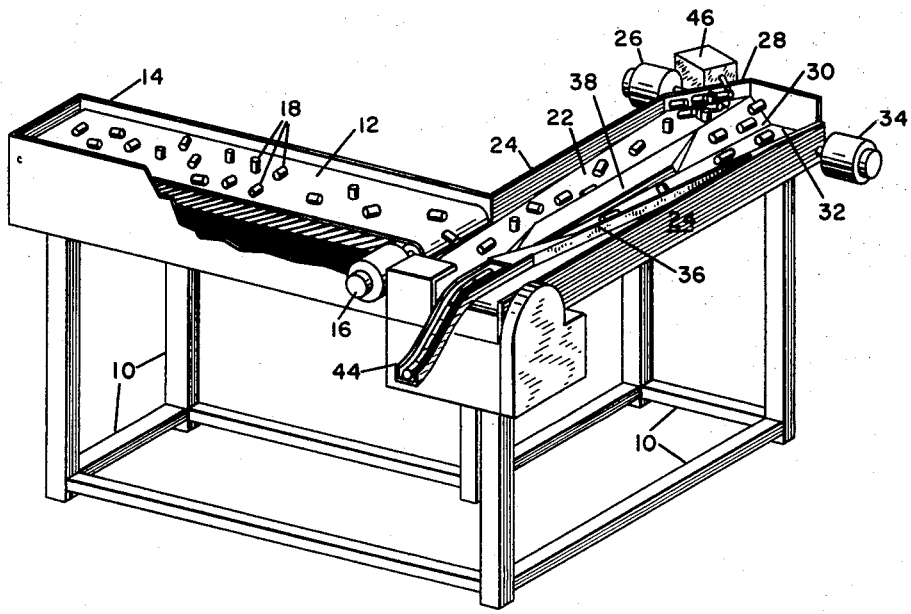

Oct. 18, 1960   M. M. ARLIN   2,956,665
PART FEEDING AND ORIENTING DEVICE
Filed Jan. 23, 1958

INVENTOR.
MAX M. ARLIN
BY Allen M Krass
ATTORNEY

United States Patent Office 2,956,665
Patented Oct. 18, 1960

2,956,665
PART FEEDING AND ORIENTING DEVICE
Max M. Arlin, Huntington Woods, Mich., assignor to John D. MacArthur, Chicago, Ill.
Filed Jan. 23, 1958, Ser. No. 710,661
5 Claims. (Cl. 198—33)

This invention relates to a device for providing a production machine with a supply of oriented parts in accordance with the rate of utilization of the parts by the machine. More particularly, the invention relates to a device for orienting and feeding cylindrical parts which have a fine surface finish without marring that finish.

Devices which store a plurality of workpieces and which feed those workpieces to a machine in an oriented manner in accordance with the requirements of the machine are well known to the art. These devices include rotary and vibratory hoppers which continually agitate a large number of the parts so that the parts are continually changing their physical orientation. Scoop or pick-up devices are provided which receive those parts which are disposed in a particular orientation that is desired. During the tumbling or agitating process these workpieces are continually striking one another and the walls of the hopper. These tumbling processes may not, therefore, be used when it is important to preserve the surface finish of the workpieces. The constant collision would quickly destroy a fine surface finish.

An object of the present invention is to provide a device for orienting cylindrical workpieces and feeding them to an automatic machine in accordance with the demands of the machine which does not cause the parts to continually strike one another or the walls of the container so as to mar their surface finish. Such a device is valuable for feeding finished cylindrical parts such as piston pins and wrist pins to consuming machines.

In essence, the invention comprises a pair of conveyor belts which are disposed parallel to one another and run in opposite directions. At one end of the belts an inclination directs parts which have reached the end of the first belt on to the beginning of the second belt. The opposite end, a complementary inclination, leads the parts that have reached the end of the first belt and the beginning of the second. In traversing the inclination the workpieces tend to roll with their axes perpendicular to the direction of their motion, and thereby assume a particular oriented attitude. A receiving track located adjacent to the termination of one of the belts receives those parts which have assumed the exact position that is desired. The other parts continue to move up one belt, down one incline to the other belt and back up to the second incline until they have reached the exact desired orientation.

An electronic control device having a limit switch has its sensing element control the flow of parts to the recirculating belt system from a third supply belt which receives parts either manually or automatically from a supply machine. The supply belt is elevated with respect to the recirculating belt system so that parts reaching the termination of the supply belt fall on to one of the recirculating belts.

The recirculating belt system achieves the constant motion and reorientation of the workpieces that occurs in the vibratory and rotary hopper systems but it does this without the necessity of any contact between the parts or the walls of the system. By carefully controlling the number of parts moving on the recirculating belt system, the contact between the various parts may be held at an absolute minimum so as to insure the maintenance of the same surface finish of the parts which they have on introduction to the system.

By replacing the inclinations which connect the two belts with other types of orienting devices it is possible to use the system for feeding and orienting shapes other than cylindrical with the same retention of surface finish.

Figure 2:
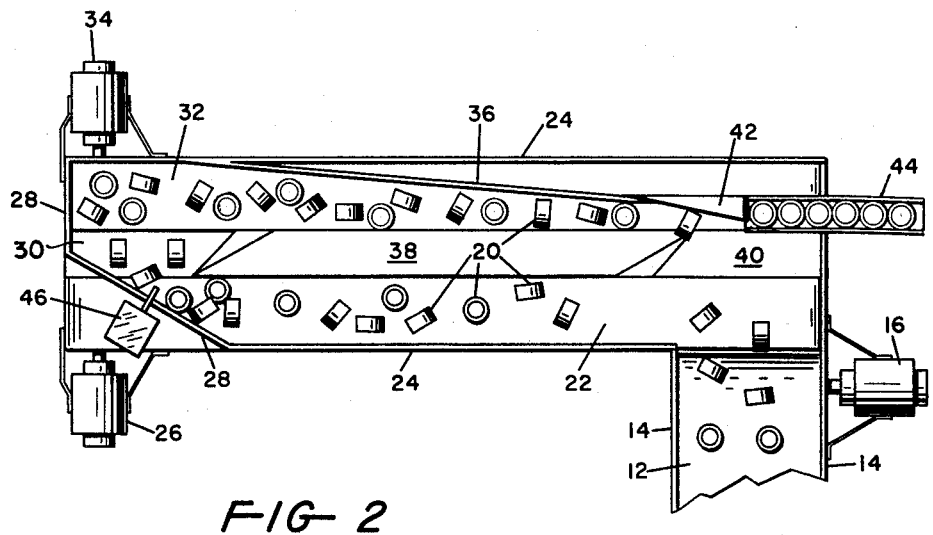

Other advantages and applications of the present invention will be made clear by the following detailed description of an embodiment of the invention. The description makes reference to the accompanying drawings, in which:

Figure 1 is a perspective view of a preferred embodiment of the invention; and
Figure 2 is a plan view of the same embodiment.

The feeding and orienting mechanism is supported on a steel base 10 which maintains the apparatus at a sufficient height that it may gravity feed the workpieces to the consuming machine.

A supply conveyor belt 12 is supported by the base 10 within a frame work that includes sidewalls 14 which extend several inches above the top surface of the belt 12 so as to retain workpieces on the belt. The belt 12 is powered by an electric motor 16 which is operative to move the belt in a generally right-hand direction as seen in Figure 1. The workpieces, which may be cylindrical in shape 18 as shown in Figure 1 or alternatively annular in shape 20 as shown in Figure 2, are introduced to the feeding and orienting system at the extreme left-hand end of the belt 12, as viewed in Figure 1. They may be placed on the belt manually or may be fed to the input portion of the belt from a machine which produces parts. They may be disposed on the belt in any concentration consistent with the condition that they do not excessively strike one another when moved.

Moving under the power of the electric motor 16, the belt 12 deposits the workpieces 18 and 20 onto a second conveyor belt 22 which is disposed at right angles to the belt 12 in a leg of the feeding apparatus which is enclosed by sidewalls 24. The belt 22 is supported with its longitudinal axis at an upwardly inclined angle and has its lower end directly below the adjacent point of the belt 12. It may also be slightly inclined in the direction traverse to its movement in such a manner that its highest point is adjacent to the side wall 24.

The belt 22 is powered by an electric motor 26 which is operative to move the belt so as to convey the workpieces away from the belt 12 and toward the end which is powered by the motor 26. Adjacent to the end of the belt 22 powered by the motor 26, the retaining wall 24 angles across the belt at 28 so as to force the workpieces toward the edge of the belt 22 opposite to the retaining wall 24. At that inner edge of the belt 22, an incline 30 leads downwardly to the second recirculating belt 32.

The belt 32 slopes along its length in a complementary manner to the belt 22, that is, its lowest end is adjacent to the highest end of the belt 22, and its highest end is adjacent to the lowest end of the belt 22. The belt 32 also gently inclines in a direction traverse to its length away from the belt 22 so as to urge the workpieces 18 and 20 against its outermost edge. The belt 32 is powered by an electric motor 34.

A guide member 36 extends diagonally across most of the length of the belt 32 so as to urge the workpieces toward the inner edge of the belt. The workpieces are prevented from falling off either the belts 22 or 32 by a center island 38 which extends between the incline 28 and another incline 40 which slopes downwardly from the end of the belt 32 to the beginning of the belt 22.

As the workpieces 18 approach the extreme end of the belt 32 those that are in the properly oriented position, that is with their axes extending in the direction of their motion, pass under a cut-off bar 42 which extends across the top of the remaining section of the belt 32 at a height just slightly above the normal passage height of a correctly oriented workpiece. Those workpieces 18 which have their axes parallel to the direction of the movement of the belt are not disturbed by the cutoff bar 42. Only those workpieces 18 which are disposed at angles or are piled one on top of the other are moved by the bar.

Those workpieces 18 which are perfectly oriented are carried directly into a chute 44 that descends to the machine which utilizes the part (not shown). The chute 44 extends over the belt 32 which forms its bottom so that oriented parts are carried a distance down the chute. If the chute 44 is full or if the parts are not perfectly aligned they roll down the incline 40 to the beginning of the belt 22 and again recirculate along the belts. The incline 40 again causes the parts to roll so as to tend to cause their axes to become aligned with the direction of motion of the belts 22 and 32. In Fig. 2, the workpieces 20 are shown advancing along the belt 22 to the incline 30. Some of the workpieces 20 will tend to roll, while others will tend to slide, down the incline 30. The workpieces 20 that are oriented with their axes perpendicular to the belt 32 are moved by the belt 32 and guided by the guide member 36 until they fall into the chute 44 because they can pass beneath the cutoff bar 42. The workpieces 20 that are oriented so that they cannot pass under the cutoff bar 42 do not enter the chute 44, and they are recirculated by means of the slides 40 and 30 until their axes are perpendicular to the belt 32 so that they may enter the chute 44.

The limit switch 46 that is disposed adjacent to the motor 26 has its arm extending into the farthest corner of the belt 32 and acts through an electronic control circuit of the type described in my patent application Serial No. 632,702, filed January 7, 1957, and issued on April 1, 1958, as Patent No. 2,828,873, to control the action of the motor 16 which powers the supply belt 12. Generally, when there are sufficient parts on the belt to actuate the arm of the limit switch 46, the motor 16 is shut off; and when no parts actuate the arm of the limit switch 46 for a certain time interval, the motor 16 is energized so as to feed more parts on to the belt 22.

Since the motion of the workpieces past the feeding channel 44 is energized by the movement of the belts 22 and 32 rather than by the agitation of the parts, the striking against one another and the sides of the unit is maintained at a minimum. It is to be understood that the provision of appropriate aligning fixtures in place of the inclines 28 and 48 would allow the apparatus of the present invention to be utlized with non-cylindrical parts.

In other embodiments of the invention it would be possible to provide a single orienting incline connecting the ends of a U-shaped belt provided with suitable guiding side walls.

Having thus described my invention, I claim:

1. In a material feeding and orienting device in combination: a first conveyor belt operative to move workpieces in a first direction; a second conveyor belt disposed parallel and adjacent to said first belt and being operative to move material in a second direction reverse to that of said first belt, said second belt being so disposed with respect to said first belt that one of its ends is at a higher level than the adjacent end of said first belt and the other end of said second belt is at a lower level than the adjacent end of said first belt; inclined cylindrical workpiece orienting slides connecting each of the ends of the two belts; means disposed over said first belt adjacent to its raised end to direct workpiece to one of said slides to cause said workpieces to roll down said slides, and an oriented parts receiving track extending on to one of said belts and being positioned so as to receive workpieces which reach it in a correctly oriented position.

2. An article feeding and orienting device comprising in combination: a first conveyor belt operative to move parts in a first direction; a second conveyor belt parallel and adjacent to said first belt and operative to move parts in a direction opposite to the motion of said first belt, one termination of said second belt being above the adjacent termination of said first belt and the other termination of said second belt being below the adjacent termination of said first belt; inclined slides connecting each end of said first belt of the adjacent end of said second belt; a barrier operative to retain parts on said belts extending between said slides; means disposed over said first belts adjacent to its raised termination to direct articles to one of said slides to cause said articles to roll down, and an oriented articles receiving track extending on to one of said belts adjacent to its point of termination and being so constructed as to retain such articles as reach it in the desired oriented position.

3. A part feeding and orienting device comprising in combination: a first conveyor belt operative to move parts in a first direction; a second conveyor belt parallel and adjacent to said first belt and operative to move parts in a direction opposite to the motion of said first belt, one of the terminations of said second belt being above the adjacent termination of said first belt, the other termination of said second belt being below the adjacent termination of said first belt; inclined runways connecting each of the terminations of said first belt with the adjacent terminations of said second belt; a partition extending between said runways and being operative to maintain parts on the conveyor belts; a guard rail extending around the perimeter of the configuration formed by the two belts, so disposed as to retain parts on the belts; guide strips adjacent to the termination of said first and said second belts so disposed as to guide parts toward the inclined runways to cause cylindrical parts to roll down said inclined runways; and an oriented part pick-up device comprising horizontal and vertical guide bars disposed adjacent to the termination of one of said belts and being operative to receive parts which reach it in a desired oriented attitude.

4. A part feeding and orienting device comprising in combination: a first conveyor belt operative to move parts in a first direction; a second conveyor belt operative to move parts in a direction opposed to the direction of motion of said first belt, said second belt having one termination disposed above the adjacent termination of said first belt and having its other termination disposed below the adjacent termination of said first belt; inclined runways connecting each of the adjacent terminations of the two belts; a partition extending between the runways so as to prevent the parts from moving from one belt to the other while adjacent to the partition; external guide rails disposed so as to retain the parts from leaving the belts and to guide the parts from the termination of each belt to the adjacent runways whereby cylindrical parts will be caused to roll down said runways; and an oriented parts receiving track comprising a horizontal and a vertical cutoff member disposed adjacent to the termination of one of said belts and being operative to receive parts which are in a desired oriented position to deliver those parts to an external trackway.

5. A part feeding and orienting device comprising in combination: a first conveyor belt operative to move parts in a first direction; a second conveyor belt operative to move parts in a direction opposed to the direction of motion of said first belt, one termination of said second belt being raised above the adjacent termination of said first belt and the other termination of said second belt being below the adjacent termination of said first belt; inclined gravity operated part orienting slides connecting each of the adjacent terminations of said belts whereby cylindrical parts will be caused to roll down said slides; an oriented part receiving device disposed adjacent to one of the terminations of one of the belts and being operative to receive parts which reach it in a desired oriented position and to deliver the parts to a track; and means for maintaining an approximate predetermined number of parts on said conveyor belts.

References Cited in the file of this patent

UNITED STATES PATENTS

| | | |
|---|---|---|
| 1,237,315 | Eby | Aug. 21, 1917 |
| 2,003,097 | Vickery | May 28, 1935 |
| 2,580,229 | Kendall | Dec. 25, 1951 |
| 2,581,732 | Thompson | Jan. 8, 1952 |